(12) United States Patent
Neuvirth et al.

(10) Patent No.: US 11,290,473 B2
(45) Date of Patent: Mar. 29, 2022

(54) AUTOMATIC GENERATION OF DETECTION ALERTS

(71) Applicant: MICROSOFT TECHNOLOGY LICENSING, LLC, Redmond, WA (US)

(72) Inventors: Hani Hana Neuvirth, Redmond, WA (US); Owen Joseph Davis, Sammamish, WA (US); Scott Elliott Gorlick, Snohomish, WA (US); Gueorgui Bonov Chkodrov, Redmond, WA (US); Yotam Livny, Gadera (IL); Dawn Antonette Burns, Lynnwood, WA (US); Zhipeng Zhao, Bellevue, WA (US); Julian Federico Gonzalez, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 280 days.

(21) Appl. No.: 16/536,201

(22) Filed: Aug. 8, 2019

(65) Prior Publication Data
US 2021/0044606 A1     Feb. 11, 2021

(51) Int. Cl.
*H04L 29/06*     (2006.01)

(52) U.S. Cl.
CPC ...... *H04L 63/1425* (2013.01); *H04L 63/1416* (2013.01); *H04L 63/1433* (2013.01); *H04L 63/1441* (2013.01)

(58) Field of Classification Search
CPC ............ H04L 63/1425; H04L 63/1416; H04L 63/1433; H04L 63/1444
See application file for complete search history.

(56) References Cited

U.S. PATENT DOCUMENTS

| 7,363,656 | B2 | 4/2008 | Weber et al. |
| 8,245,294 | B1 | 8/2012 | Zahra et al. |
| 8,495,429 | B2 | 7/2013 | Fu et al. |
| 8,779,921 | B1 | 7/2014 | Curtiss |
| 9,043,922 | B1 * | 5/2015 | Dumitras ............... G06F 21/577 726/25 |
| 9,407,651 | B2 | 8/2016 | Mathis |
| 9,516,053 | B1 | 12/2016 | Muddu et al. |
| 9,654,485 | B1 * | 5/2017 | Neumann ........... H04L 63/1441 |
| 10,140,576 | B2 | 11/2018 | Eldardiry et al. |

(Continued)

OTHER PUBLICATIONS

"Non Final Office Action Issued in U.S. Appl. No. 16/265,742", dated May 26, 2021, 12 Pages. (MS# 405625-US-NP).

(Continued)

*Primary Examiner* — Ali S Abyaneh
(74) *Attorney, Agent, or Firm* — Workman Nydegger

(57) ABSTRACT

Using a set of anomalies indicative of a malicious pattern of behavior collected from data to determine new alerts for anomalies included in subsequently collected data. A set of anomalies found in data collected from data sources is accessed. The set of anomalies is determined by a prior analysis to be indicative of a malicious pattern of behavior by entities associated with the set of anomalies. Data that is subsequently collected from the data sources is searched to determine if any of the data includes the set of anomalies. Alerts are generated for any of the subsequently collected data that includes the set of anomalies.

20 Claims, 5 Drawing Sheets

(56) References Cited

U.S. PATENT DOCUMENTS

| | | | | |
|---|---|---|---|---|
| 2003/0110398 | A1* | 6/2003 | Dacier | G06F 21/55 |
| | | | | 726/4 |
| 2006/0018466 | A1* | 1/2006 | Adelstein | H04L 63/1491 |
| | | | | 380/46 |
| 2010/0125663 | A1* | 5/2010 | Donovan | G06F 21/552 |
| | | | | 709/224 |
| 2015/0256554 | A1 | 9/2015 | Sakakibara et al. | |
| 2017/0234435 | A1* | 8/2017 | Hermann | F02B 37/183 |
| | | | | 60/602 |
| 2019/0207976 | A1* | 7/2019 | Yadav | H04L 63/1491 |
| 2020/0252417 | A1 | 8/2020 | Neuvirth et al. | |

OTHER PUBLICATIONS

Hendry, et al., "Intrusion Signature Creation via Clustering Anomalies", In Proceedings of Data Mining, Intrusion Detection, Information Assurance, and Data Networks Security, vol. 6973, Mar. 17, 2008, 12 Pages.

"International Search Report and Written Opinion Issued in PCT Application No. PCT/US20/037350", dated Sep. 14, 2020, 13 Pages. (MS#406982-WO-PCT).

"International Search Report and Written Opinion Issued in PCT Application No. PCT/US2020/014534", dated Apr. 3, 2020, 11 Pages. (MS# 405625-WO-PCT).

"Final Office Action Issued in U.S. Appl. No. 16/265,742", dated Oct. 26, 2021, 13 Pages.

* cited by examiner

AUTOMATIC GENERATION OF DETECTION ALERTS

BACKGROUND

Anomaly detection is often used to detect anomalies in various computing systems. In a typical scenario, an alert that is related to an entity of the computing such as a computer name or IP address and that indicates a potential anomaly is generated by the computing systems. In response, data sources that log information about the computing system are then subjected to anomaly detection to discover any anomalies and if they are of a malicious type.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, methods, and computer readable media for using a set of anomalies indicative of a malicious pattern of behavior collected from data to determine new alerts for anomalies included in subsequently collected data. A set of anomalies found in data collected from data sources is accessed. The set of anomalies is determined by a prior analysis to be indicative of a malicious pattern of behavior by entities associated with the set of anomalies. Data that is subsequently collected from the data sources is searched to determine if any of the data includes the set of anomalies. Alerts are generated for any of the subsequently collected data that includes the set of anomalies.

Additional features and advantages will be set forth in the description which follows, and in part will be obvious from the description, or may be learned by the practice of the teachings herein. Features and advantages of the embodiments disclosed herein may be realized and obtained by means of the instruments and combinations particularly pointed out in the appended claims. Features of the embodiments disclosed herein will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
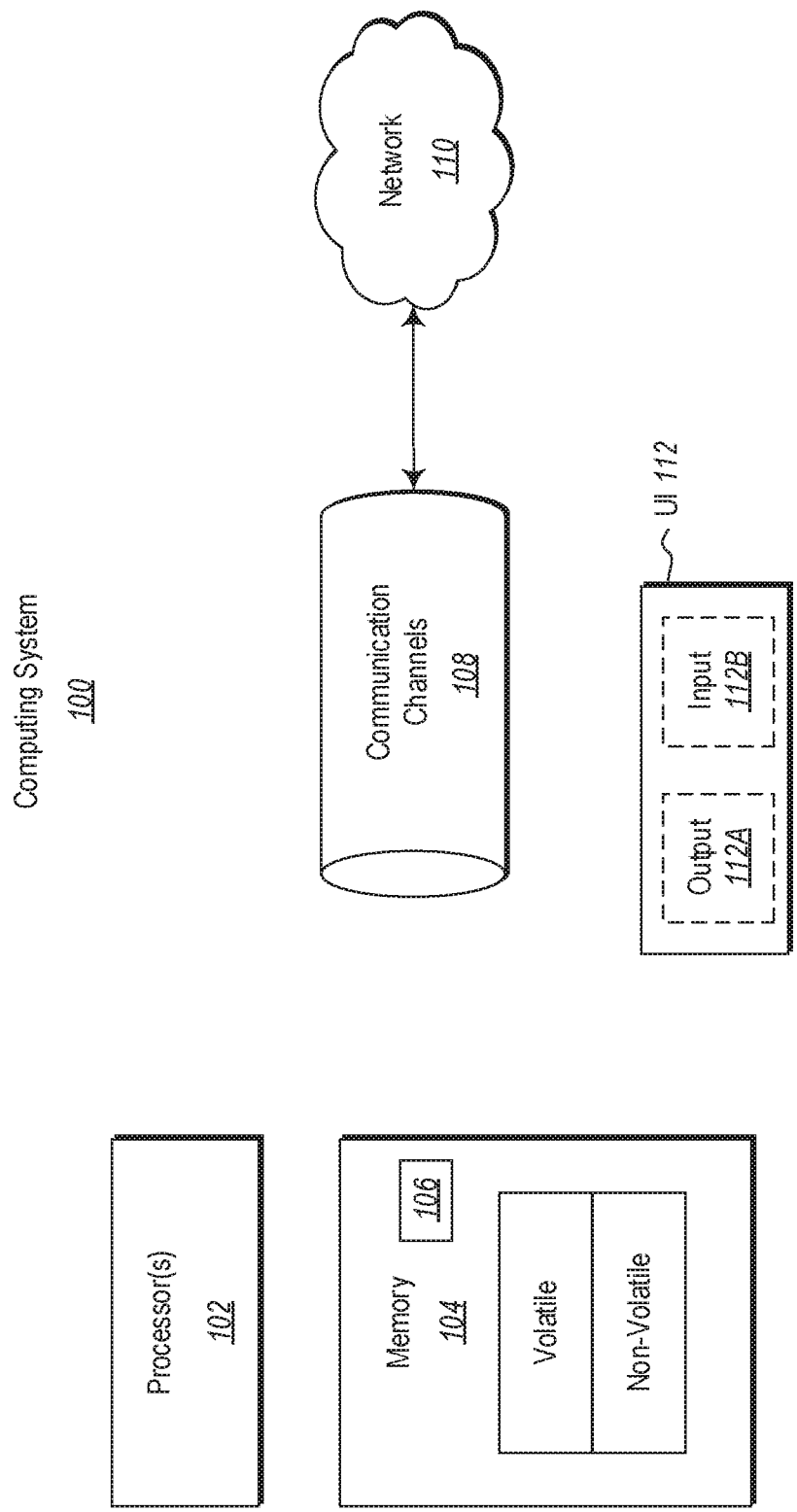
FIG. 1 illustrates an example computing system in which the principles described herein may be employed.

Anomaly detection is often used to detect anomalies in various computing systems. In a typical scenario, an alert that is related to an entity of the computing such as a computer name or IP address and that indicates a potential anomaly is generated by the computing systems. In response, data sources that log information about the computing system are then subjected to anomaly detection to discover any anomalies and if they are of a malicious type.

In many computing systems, a human user is needed to investigate the alert to determine if there are any of anomalies and if they are of the malicious type. This process can be time consuming if there are a large number of data sources to search when investigating the alert. This may also lead to an increased time for the anomaly detection and an increased use of computing resources. In addition, it may also lead to an increased number of false positive anomalies.

Some computing systems provide a detection procedure that detects the potential anomalies in the data sources that are related to the entity of the alert. The detection procedure may then provide a "hint" as to the source or cause of the anomaly, which may greatly speed up the investigation of the alert. In addition, the detection procedure may be performed over one or more time windows that help to increase the accuracy of the procedure, thus potentially reducing the number of false positives.

Upon investigating the alert, a human user is able to determine which of the anomalies that cause an alert to be triggered are caused by actual malicious activities and which ones are caused by random, non-malicious occurrences. The set of malicious anomalies may show patterns of behavior by entities that are indicative of malicious behaviors. The embodiments disclosed herein take the anomalies that have been determined to be indicative of a pattern of malicious behavior and use those anomalies to search for new detection or alert leads in subsequently received data. In the embodiments, the subsequently received data is automatically searched for combinations of the anomalies that have been determined to be indicative of a pattern of malicious behavior. An alert is then generated for the data that includes the combination of anomalies. These combinations of anomalies may then be evaluated to determine if they lead to the detection of a sufficient amount of true positive anomalies. If so, the combinations may then be automatically included in subsequent anomaly detection procedures.

The embodiments disclosed herein provide several technical advances over conventional systems. For example, embodiments disclosed herein provide for an automatic way to generate additional detection leads based on already determined patterns of malicious behavior. This in turn may lead to the detection of one or more anomalies that might otherwise not be detected as different combinations known true positive anomalies are automatically searched without the need for a human user. Accordingly, time and computing resources are saved.

Because the principles described herein may be performed in the context of a computing system, some introductory discussion of a computing system will be described with respect to FIG. 1. Then, this description will return to the principles of the embodiments disclosed herein.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 100 previously described. The computing systems of the remaining figures may include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
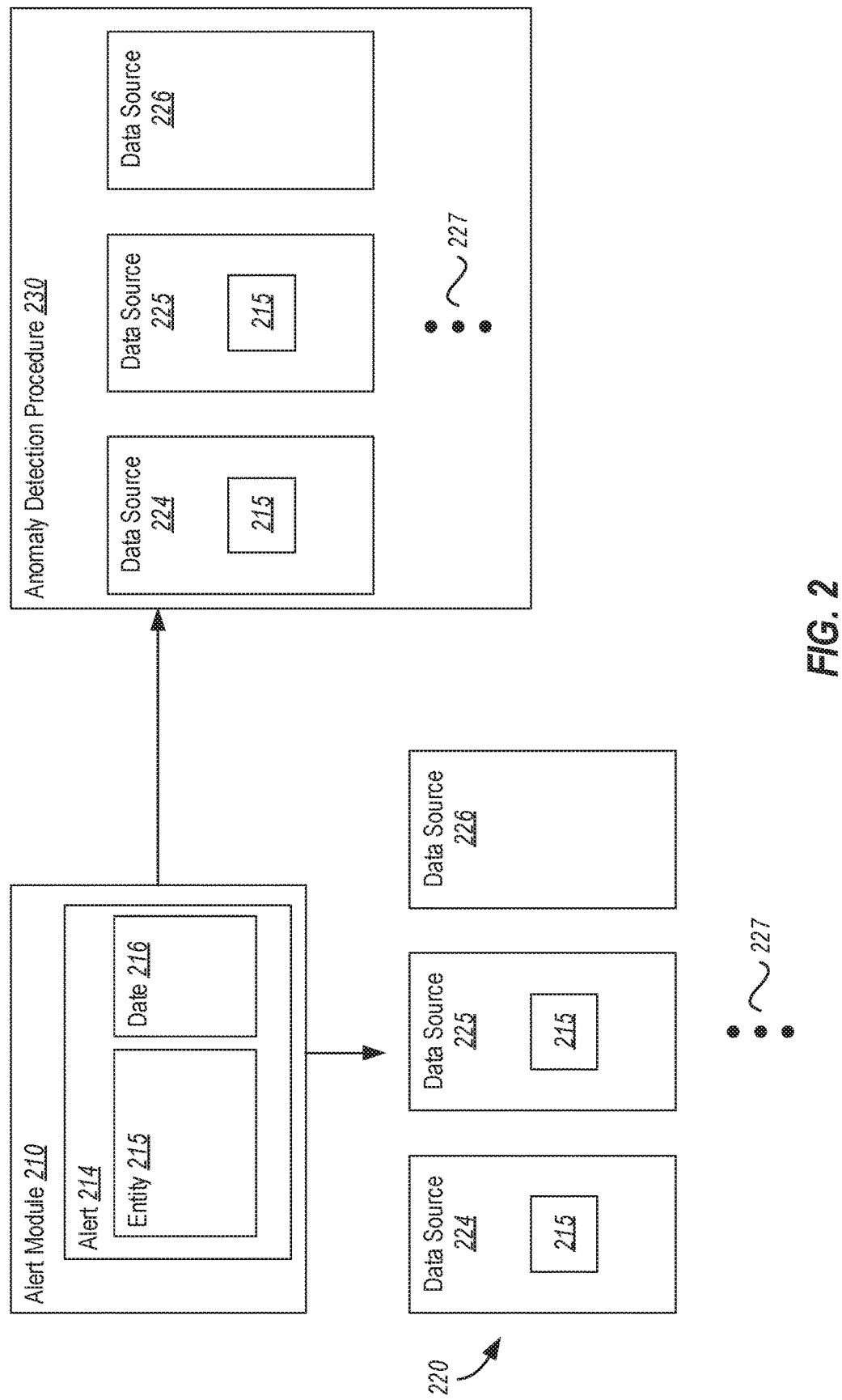
FIG. 2 illustrates an example environment for performing anomaly detection in a computing system.

FIG. 2 illustrates an environment 200 of a computing system. As illustrated, environment 200 includes an alert module 210 and various data sources 220, including data source 224, 225, 226, and any number of additional data sources as illustrated by ellipses 227. In some embodiments, the data sources 220 may include, but are not limited to, logs from one or more of a specific computer, routers on a network, an application, an operating system, network infrastructure, and cloud computing infrastructure. That is, during operation various elements of a computing system such as individual computers and like devices, operating systems and applications running on the computers, network infrastructure such as routers and the like, and cloud computing infrastructure all generate logs of their operations. Of course, it will be appreciated that additional computing system elements may also generate logs as needed.

The alert module 210, which may be part of a computing system that is different from those hosting the various data sources, may be configured in operation to generate an alert 214 when an anomaly of some sort is detected in one or more of the data sources 220 or is detected in some other reasonable way known to those of skill in the art. An anomaly may be considered a behavior or action by an entity (i.e., entity 215) that is outside of an expected behavior or action of the entity. An anomaly may include random operational occurrences that does not normally occur, such as a power surge or the like, that are generally not malicious in nature as they are not indicative of any bad intent by the entity that generates the anomaly. An anomaly may also include a malicious activity such as a brute force attack to overwhelm the security protections of the computing system, an attempt to fraudulently impersonate an entity, or an attempt to fraudulently make a purchase. These types of anomalies are malicious in nature as they are indicative of a bad intent against the computing system by the entity that generates the anomaly. In any event, the anomaly may cause the alert module to generate the alert 214.

An entity 215 may be associated with the alert 214. The entity 215 may identify a source of the anomaly that caused the alert to be generated. For example, the entity 215 (and all other entities discussed herein) may be, but is not limited to, a machine or computer name, a user name, an IP address, or a network identifier that identifies the source of the anomaly. If the entity 215 is a machine or computer name or a user name, than this may specify that the anomaly was generated by or otherwise associated with that machine or computer or that specific user. Likewise, if the entity 215 is an IP address or a network identifier, than this may specify that the anomaly was generated by or otherwise associated with the specific IP address or network. Although only illustrated as including one entity 215, the alert 214 may include more than one entity 215 as circumstance warrant. A date 216 that may also include a time stamp that specifies the date and time of the anomaly may also be associated with the alert 214.

The environment 200 may also include an anomaly detection procedure 230. The anomaly detection procedure 230 may be any reasonable anomaly detection procedure such as various machine learning algorithms, timeline anomaly detection algorithms, and the like known to those of skill in the art that are able to detect anomalies in the data sources. In operation, the anomaly detection procedure 230 may perform its given anomaly detection on the data sources 220 to determine if the anomaly or additional anomalies associated with the entity 215 may have occurred in one or more of the data sources 220 around the date and time specified by the date 216. This information may then be used to initiate corrective actions if the detected anomalies are indicative of malicious activity or if it is otherwise deemed that corrective actions would be beneficial.

As shown in FIG. 2, the anomaly detection procedure 230 performs its anomaly detection on all of the data sources 220. However, as also shown, only the data sources 224 and 225 include data that includes or is otherwise associated with the entity 215. The data source 226 and any potential data sources 227 do not include data that is associated with the entity 215. Accordingly, the anomaly detection procedure 230 may perform the anomaly detection on many data sources that will not provide any information as to anomalies associated with the entity 215.

Figure 3:
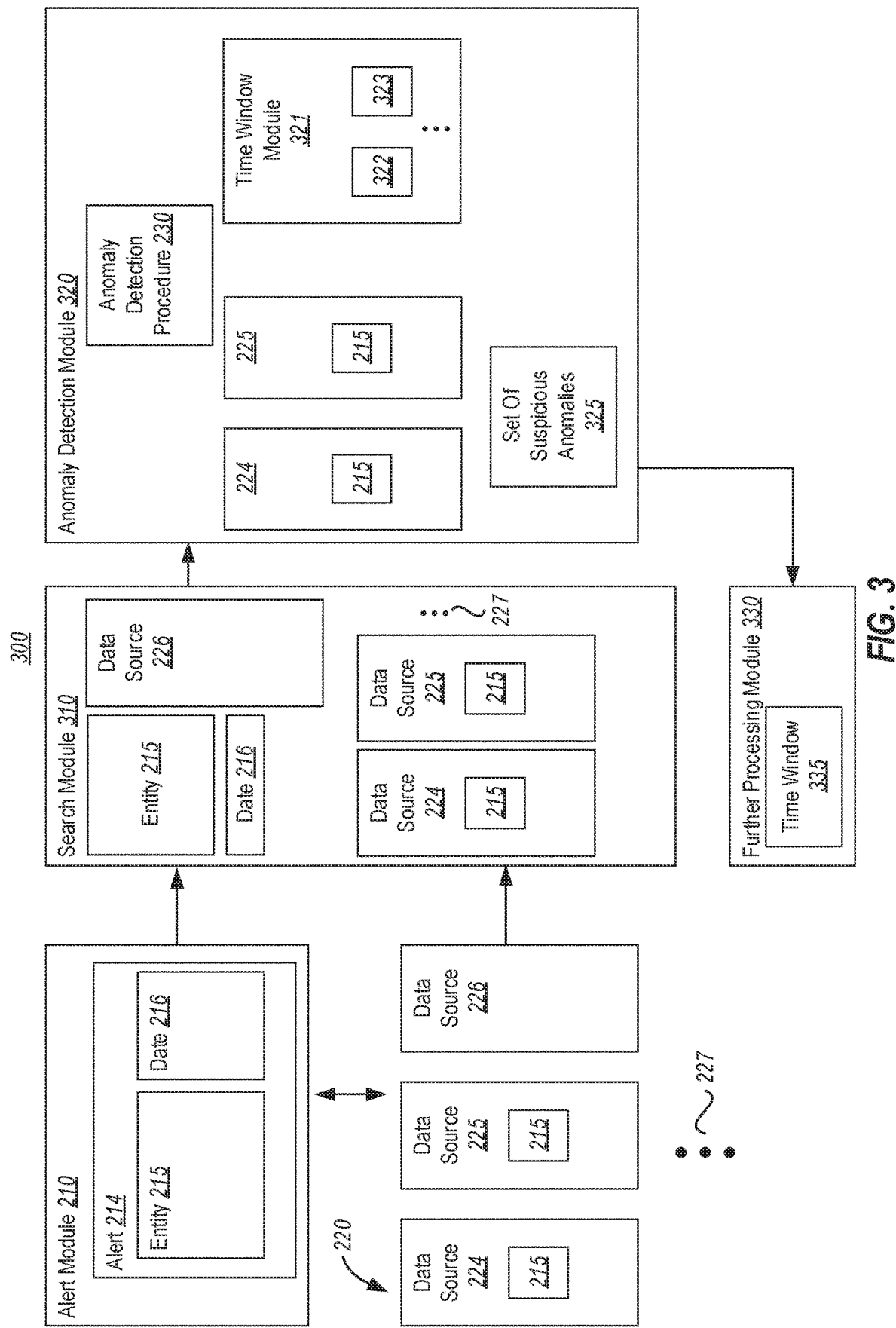
FIG. 3 illustrates an example environment for performing anomaly detection according to the embodiments disclosed herein.

FIG. 3 illustrates an environment 300 of a computing system. It will be noted that the environment 300 is only one of many possible environments and thus is not to be used to limit the embodiments disclosed herein. The environment 300 may correspond to the environment 200 and thus may include some of the elements of the environment 200. For example, as illustrated, environment 300 includes the alert module 210 and the alert 214 with its associated entity 215 and date 216. In addition, environment 300 includes the various data sources 220 including data sources 224, 225, 226, and potentially any number of additional data sources represented by the ellipses 227. Accordingly, these elements need not be explained in further detail.

The environment 300 may include a search module 310. In operation, the search module 310 may receive or otherwise access the entity 215 and the date 216 from the alert 214. The search module 310 may also access the various data sources 220. The search module 310 may then search all of the data sources 220 to determine which of the data sources includes data that includes or is otherwise associated with the entity 215 that was logged around the date 216. In this way, the search module 310 is able to determine only those data sources that are associated with the entity 215 for further anomaly detection procedures as will be explained in more detail to follow.

The environment 300 may further include an anomaly detection module 320 that may include the anomaly detection procedure 230 that performs anomaly detection on the data sources 220. As illustrated in FIG. 3, only the data sources 224 and 225 that include or are otherwise associated with the entity 215 are provided to the anomaly detection module 320 for anomaly detection analysis by the anomaly detection procedure 230. Accordingly, the embodiments disclosed herein eliminate the need for the anomaly detection on those data sources 220 (i.e., data sources 226 and 227) that do not include the entity 215.

During the anomaly detection, the anomaly detection procedure 230 may perform anomaly detection on the data sources 224 and 225 during a first time window to determine an initial set of suspicious anomalies. Accordingly, the anomaly detection module 320 may include a time window module 321 that is able to specify a time window 322. In some embodiments, the time window 322 may be set to a relatively short period of time, such as a day or less, although any desired time period may be used as circumstances require. As may be appreciated, setting the time window 322 to a relatively short period of time allows the anomaly detection to establish a baseline that can then be used to determine if the anomalies are regularly occurring, which may be indicative of a malicious anomaly, or are random occurrences that are indicative of a random, non-malicious anomaly.

The anomaly detection procedure 230 may then determine an initial set of suspicious anomalies 325 found during the time window 322. In the embodiments disclosed herein, the term "suspicious" is used to indicate that the anomalies that are found are such that further analysis may be warranted to determine if they are malicious or not. Thus, the set of suspicious anomalies may ultimately be determined to be malicious, to be non-malicious, or to include a combination of both malicious and non-malicious anomalies as will be explained in more detail to follow.

In some embodiments, the anomaly detection procedure 230 may also utilize an additional time window 323 that is specified by the time window module 320. In some embodiments, the time window 323 may be longer than the time window 322. This allows for a comparison between the anomalies found during the time window 322 with those found during the time window 321 when determining the initial set of suspicious anomalies 325.

As mentioned previously, the anomaly detection procedure 230 may be any type of reasonable anomaly detection procedure including various types of machine learning algorithms, timeline anomaly detection algorithms, and the like known to those of skill in the art. Advantageously, the embodiments disclosed herein are able to work with all types of anomaly detection procedures. That is, the search module 310 is able to search and determine those data sources 220 that include or are otherwise associated with the entity 215 without regard to the specific type of the anomaly detection procedure 230.

In some embodiments, further anomaly detection may be desired on the initial set of suspicious anomalies 325. Accordingly, in such embodiments the environment 300 may include a further processing module 330. Although shown as being separate, in some embodiments the further processing module 330 may be part of the anomaly detection module 320.

In operation, the further processing module 330 may be configured to perform a "deep dive" on the initial set of suspicious anomalies 325 to determine additional information about the anomalies. In one embodiment, this may include having the anomaly detection procedure 230 perform anomaly detection over a longer time window than the time window 322 and the time window 323 in those embodiments that utilize the time window 323. Accordingly, the further processing module 330 may include a time window module (not illustrated) or have access to the time module 321 that is able to specify a time window 335. As mentioned, the time window 335 may be a longer time period than the time windows 322 and 323.

Figure 4:
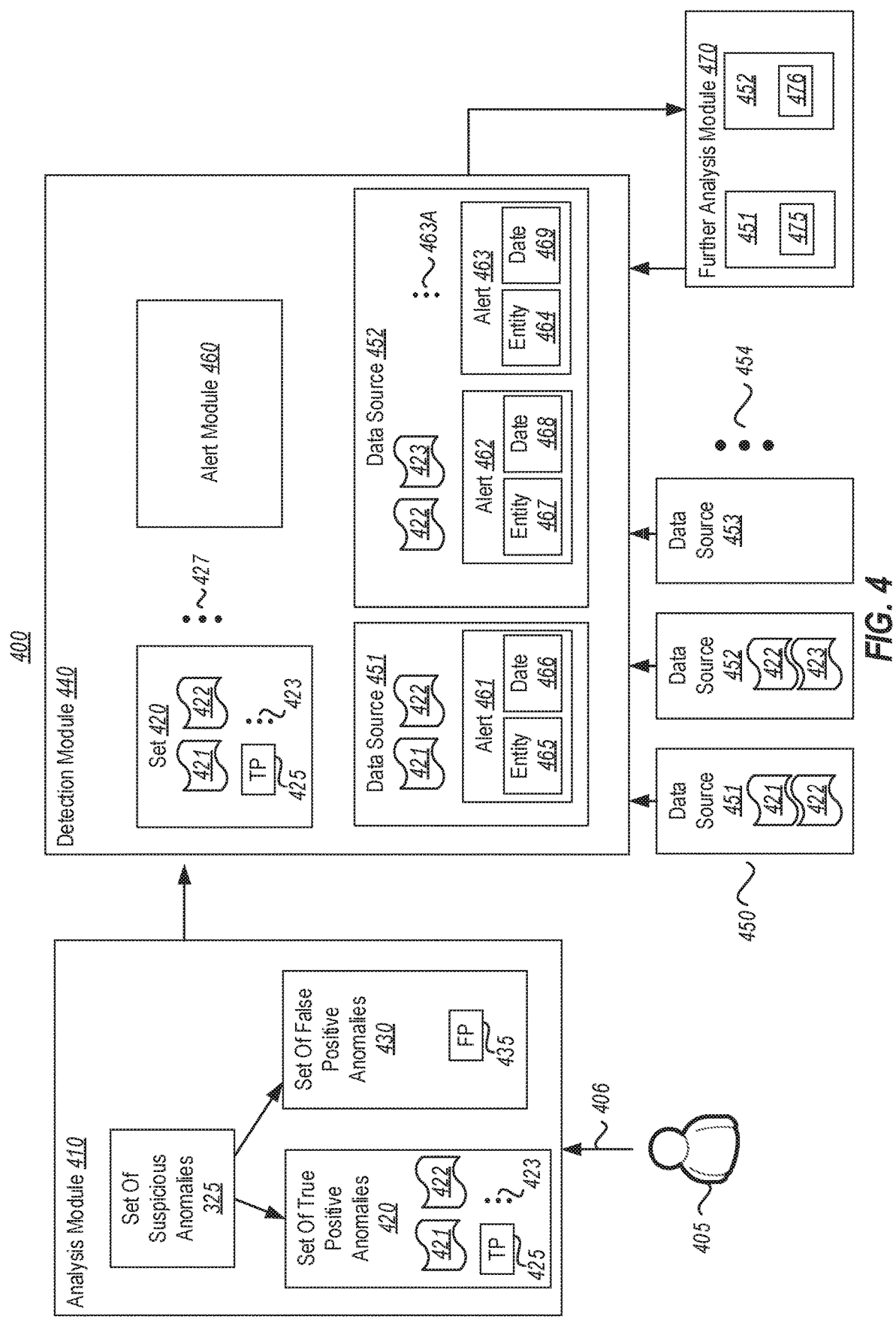
FIG. 4 illustrates an example environment for using anomalies indicative of malicious behavior to find new alerts according to the embodiments disclosed herein.

FIG. 4 illustrates an environment 400 of a computing system. It will be noted that the environment 400 is only one of many possible environments and thus is not to be used to limit the embodiments disclosed herein. The environment 400 may correspond to the environments 200 and 300 and thus may include some of the elements of the environment 200 and 300. Accordingly, any previously described elements need not be described in particular detail in relation to environment 400.

The environment 400 may include an analysis module 410. In operation, the analysis module 410 may receive or otherwise access the set of suspicious anomalies 325 that were detected in the manner previously described. A human investigator 405 may then analyze the set of suspicious anomalies 325 to determine if the detected anomalies included in the set of suspicious anomalies 325 are in fact indicative of a malicious behavior on the part of the entity 215. In other words, the investigator 405 may determine if the various anomalies are a "true positive" or a "false positive" as denoted at 406. An anomaly that is a true positive is one that is indicative of a malicious pattern of behavior on the part of the entity 215. In contrast, an anomaly that is a false positive is one that was found to not be indicative of a malicious pattern of behavior on the part of the entity 215. It will be noted that in some embodiments, the investigator 405 may be a non-human investigator as circumstances warrant.

As shown in FIG. 4, the anomalies that are determined to be true positives may be grouped into a set of true positive anomalies 420. The set of true positive anomalies 420 may include an anomaly 421, an anomaly 422, and any number of additional anomalies as illustrated by the ellipses 423. As discussed above, the set of true positive anomalies 420 include anomalies that are indicative of a malicious pattern of behavior.

In some embodiments, the set of true positive anomalies 420 may be generated in a predefined structured format. For example, the set of true positive anomalies 420 may include standard rows, columns, data formats and types, and the like that are useable by a detection module 440 or some other element of the computing system 400. The use of a structured format may help ensure that the set of true positive anomalies 420 has the same format as a set of true positive anomalies that are determined by an investigator other than the investigator 405. This may help ensure that the detection module 440 or some other element of the computing system 400 is able to easily and efficiently use the set of true positive anomalies 420 to automatically generate new alerts as will be explained in more detail to follow. As also illustrated, the investigator 405 may label the set of true positive anomalies 420 as being true positive as denoted at 425. It will be appreciated that the label 425 of "true positive" is only one example of the many ways that the investigator 405 may indicate that the set of true positive anomalies 420 are anomalies that should be used to in a further process to automatically generate the new alerts.

The anomalies that are determined to be false positives may be grouped into a set of false positive anomalies 430. The set of false positive anomalies 430 may include any number of anomalies as circumstances warrant. The set of false positive anomalies 430 may be labeled by the investigator 405 as being false positive as denoted at 435. It will be appreciated that the label 435 of "false positive" is only one example of the many ways that the investigator 405 may indicate that the set of false positive anomalies 430 are anomalies that should not be used in any further process to automatically generate the new alerts.

The environment 400 may include the detection module 440. In operation, the detection module 440 may receive or otherwise access from the analysis module 410 the set of true positive anomalies 420 that has been labeled by the investigator 405. Although the following discussion will focus on the set of true positive anomalies 420, the ellipses 427 represent that the detection module 440 may receive additional sets of true positive anomalies from the analysis module 410 or from other (not illustrated) analysis modules that have been used by various investigators who are similar to the investigator 405 to determine the sets of true positive anomalies.

As discussed previously, the anomalies 421, 422, and 423 of the set of true positive anomalies 420 are indicative of patterns of malicious behaviors. Accordingly, these anomalies may be used to help automatically generate new alerts for additional entities that may exhibit similar patterns of malicious behavior as the entity 215. Advantageously, this allows for the computing system to automatically determine additional detection leads that may be further evaluated to determine if they are true positive anomalies. It will be noted that an alert as used herein may be considered a detection lead as the generation of an alert may lead to further evaluation of an anomalies that caused the alert to be generated.

As illustrated, the environment 400 may include various data sources 450, including data source 451, 452, 453, and any number of additional data sources as illustrated by ellipses 454. In some embodiments, the data sources 450 may correspond to the data sources 220 and thus may include, but are not limited to, logs from one or more of a specific computer, routers on a network, an application, an operating system, network infrastructure, and cloud computing infrastructure.

The detection module 440 may receive or otherwise access the various data sources 450. The detection module 440 may then search each of the data sources 450 to determine if the data sources include data including one or more of the anomalies 421, 422, and 423. As illustrated, the data source 451 includes data including the anomalies 421 and 422 and the data source 452 includes data including the anomalies 422 and 423. However, the data sources 453 and 454 do not include data including any of the anomalies 421, 422, and 423 and so further action is not performed on the data sources 453 and 454.

The detection module 440 may include an alert module 460, which may correspond to the alert module 220 or which may be a separate alert module. In operation, the alert module 460 may generate an alert when any portion of the data included in the data sources includes one or more of the anomalies 421, 422, and 423. For example, the alert module 460 may generate an alert 461 for the data source 451 since the data source 451 includes data including the combination of the anomalies 421 and 422. In some embodiments, the alert 461 may indicate an entity 465 that performed the pattern of behavior associated with the anomalies 421 and 422. The alert 461 may also include a date and/or time stamp 466 that indicate when the anomalous behavior occurred.

Likewise, the alert module 460 may generate an alert 462 for the data source 452 since the data source 453 includes data including the combination of the anomalies 422 and 423. The alert 462 may indicate an entity 467 that performed the pattern of behavior associated with the anomalies 422 and 423. The alert 461 may also include a date and/or time stamp 468 that indicate when the anomalous behavior occurred.

In some embodiments, the alert module 460 may generate more than one alert for a given data source. Accordingly, as illustrated the alert module 460 may also generate an additional alert 463 for the data source 452 for the combination of the anomalies 422 and 423. The alert 463 may indicate an additional entity 464 that also performed the pattern of behavior associated with the anomalies 422 and 423. The alert 461 may also include a date and/or time stamp 469 that indicate when the anomalous behavior occurred. Accordingly, the alert module 460 is able to generate any number of alerts as circumstances warrant as illustrated by the ellipses 463A. Indeed, in many instances a large number of alerts may be generated for a given combination of true positive anomalies.

Accordingly, since the anomalies 421 and 422 are indicative of a malicious pattern of behavior and the entity 465 performed similar behaviors so as to cause the detection of these anomalies, it is likely that the entity 465 is also engaged in malicious behavior. Likewise, since the anomalies 422 and 423 are indicative of a malicious pattern of behavior and the entities 464 and 467 performed similar behaviors so as to cause the detection of these anomalies, it is likely that the entities 464 and 467 are also engaged in malicious behavior. Accordingly, the use of the anomalies 421, 422, and 423 resulted in the detection of additional malicious behavior.

As may be noted, the human investigator 405 and any other similar human investigators may only be able to identify and label a relatively small number of detected anomalies as being "true positive" anomalies. Advantageously, by using the combination of anomalies that have been labeled as being true positives (i.e., showing the pattern of behavior indicative of a malicious activity), the embodiments disclosed herein allow for all (or at least a substantial amount) of the data sources 450 to have alerts generated when the data sources include the combination of anomalies. This in turn provides for a larger number of detection leads that can then be evaluated to determine if the detection lead are themselves valuable to use as future detection leads.

Accordingly, in some embodiments the environment 400 may include a further analysis module 470. In operation, the further analysis module 470 may receive or otherwise access the data sources 451 and 452 that have had the alerts 461, 462, and 463 generated as previously described. An investigator, who may be the human investigator 405, some other human investigator, or some non-human investigator may then evaluate the alerts 461, 462, and 463 and their associated anomalies to see if the combination of the anomalies are themselves valuable to use as the future detection leads.

For example, if the evaluation shows that the combination of the anomalies 421 and 422 that led to the generation of the alert 461 causes a sufficient enough detection of true positive anomalies, then this combination may automatically be used by the detection module 440 in future searches of the data sources 450 to determine if the data sources include the combination of the anomalies. In such case, the combination of the anomalies 421 and 422 may be labeled as "true positive" 475 or some other indicator that the combination should be used in the future detection by the detection module 440. In contrast, if the evaluation shows that the combination of the anomalies 421 and 422 does not cause a sufficient enough detection of true positive anomalies, then the combination may be labeled as "false positive" 475 and discarded for future detection by the detection module.

In similar manner, if the evaluation shows that the combination of the anomalies 422 and 423 that led to the generation of the alerts 462 and 463 causes a sufficient enough detection of true positive anomalies, then this combination may also automatically be used by the detection module 440 in future searches of the data sources 450 to determine if the data sources include this combination of the anomalies. In such case, the combination of the anomalies 422 and 423 may be labeled as "true positive" 476 or some other indicator that the combination should be used in the future detection by the detection module 440. In contrast, if the evaluation shows that the combination of the anomalies 422 and 423 does not cause a sufficient enough detection of true positive anomalies, then the combination may be labeled as "false positive" 476 and discarded for future detection by the detection module.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
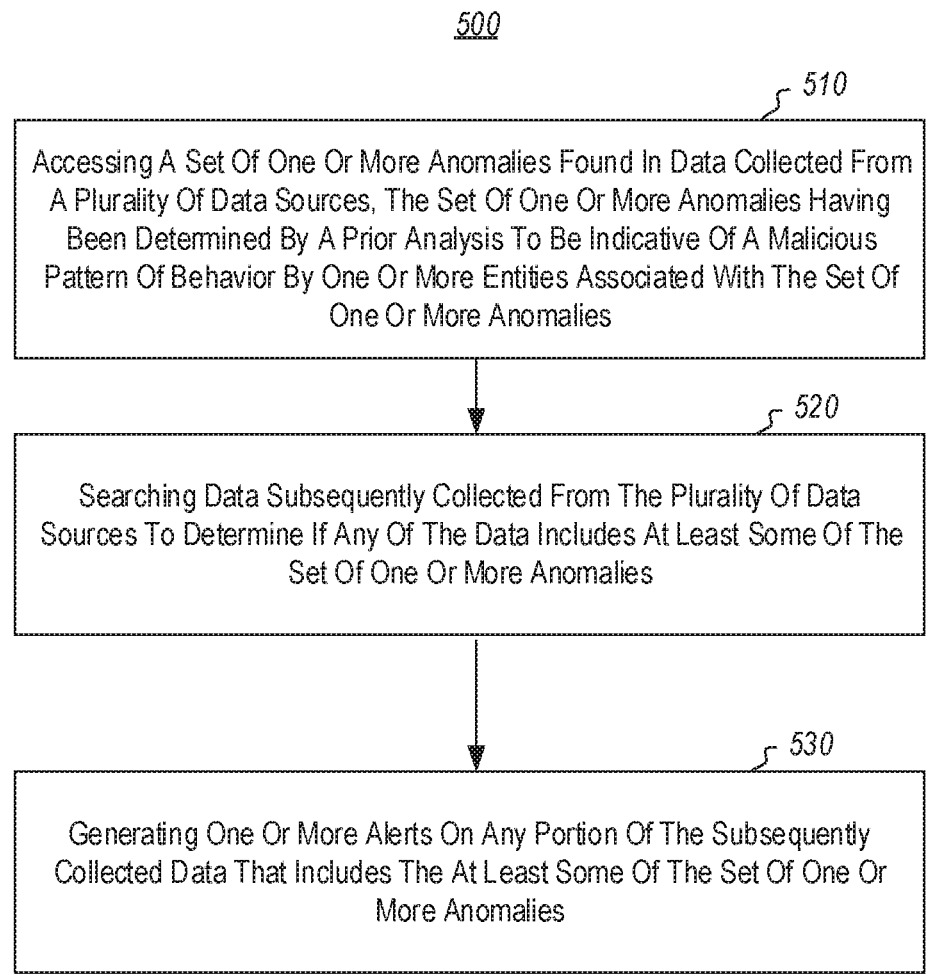
FIG. 5 illustrates a flow chart of an example method for using anomalies indicative of malicious behavior to find new alerts.

FIG. 5 illustrates a flow chart of an example method 500 for using a set of anomalies indicative of a malicious pattern of behavior collected from data to determine new alerts for anomalies included in subsequently collected data. The method 500 will be described with respect to one or more of the figures discussed previously.

The method 500 includes accessing a set of one or more anomalies found in data collected from a plurality of data sources, the set of one or more anomalies having been determined by a prior analysis to be indicative of a malicious pattern of behavior by one or more entities associated with the set of one or more anomalies (510). For example, as previously described the detection module 440 may access the set of true positive anomalies 420 that includes the anomalies 421, 422, and potentially 423. The human investigator 405 may have previously determined that the set of true positive anomalies 420 are indicative of a malicious pattern of behavior by the entity 215 and labeled the set 420 set accordingly as shown at 425.

The method 500 includes searching data subsequently collected from the plurality of data sources to determine if any of the data includes at least some of the set of one or more anomalies (520). For example, as previously described the detection module 440 may search the data subsequently collected from the data sources 450 to determine if any of the data includes any combination of the anomalies 421, 422, and 423.

The method 500 includes generating one or more alerts on any portion of the subsequently collected data that includes the at least some of the set of one or more anomalies (530). For example, as previously described the alert module 460 may generate the alerts 461, 462, and 463 when the combination of the anomalies 421, 422, and 423 is included in one or more of the data sources. The alerts may identify the entities 464, 465, or 467 that have caused the alerts to be generated by performing activities that are similar to the pattern of malicious activities performed by the entity 215.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable storage media having thereon computer-executable instructions that are structured such that, when executed by the one or more processors, configure the computing system to:
   access a set of one or more patterns of malicious behaviors associated with a first set of anomalies found in data collected from a plurality of data sources, the set of one or more patterns of malicious behaviors having been determined by a prior analysis of the first set of anomalies, the prior analysis comprising:
      for each first entity associated with at least one anomaly in the first set of anomalies,
         determining if the at least one anomaly associated with the first entity is indicative of a pattern of malicious behavior; and
         in response to determining that the at least one anomaly associated with the first entity is indicative of a pattern of malicious behavior, determining that the entity is a malicious entity;
   search data subsequently collected from the plurality of data sources to identify a second set of anomalies; and
   for each second entity associated with at least one anomaly in the second set of anomalies,
      determine if the at least one anomaly associated with the second entity corresponds to a pattern of malicious behavior in the set of one or more patterns of malicious behaviors determined by the prior analysis; and
      in response to determining that the at least one anomaly associated with the second entity corresponds to the pattern of malicious behavior in the set of one or more patterns of malicious behavior, determine that the second entity is a new malicious entity; and
   generate one or more alerts on any portion of the subsequently collected data that is associated with at least one malicious entity.

2. The computing system of claim 1, wherein the computer-executable instructions are structured, when executed, to further cause the computing system to:
   receive an evaluation of the one or more alerts generated by the inclusion of the at least some of the set of one or more anomalies, the evaluation indicating whether the at least some of the set of one or more anomalies are suitable to be used in a subsequent anomaly detection procedure.

3. The computing system of claim 2, wherein the computer-executable instructions are structured, when executed, to further cause the computing system to:
   use the at least some of the set of one or more anomalies that are determined to be suitable in the subsequent anomaly detection procedure.

4. The computing system of claim 1, wherein the set of one or more anomalies is implemented in a structured format that is useable by the computing system when searching the subsequently collected data for inclusion of the at least some of the set of one or more anomalies.

5. The computing system of claim 1, wherein the generated one or more alerts specify one or more entities associated with the at least some of the set of one or more anomalies and date that the at least some of the set of one or more anomalies occurred.

6. The computing system of claim 5, wherein the one or more entities comprise one or more of a machine name, a user name, an IP address, or a network identifier.

7. The computing system of claim 5, wherein the date that alert occurred also includes an associated time stamp.

8. The computing system of claim 1, wherein the plurality of data sources include logs from one or more of a specific computer, routers on a network, an application, an operating system, network infrastructure, and cloud computing infrastructure.

9. A method for using a set of anomalies indicative of a malicious pattern of behavior collected from data to determine new alerts for anomalies included in subsequently collected data, the method comprising:
   accessing a set of one or more patterns of malicious behaviors associated with a first set of anomalies found in data collected from a plurality of data sources, the set of one or more patterns of malicious behaviors having been determined by a prior analysis of the first set of anomalies, the prior analysis comprising:
      for each first entity associated with at least one anomaly in the first set of anomalies,
         determining if the at least one anomaly associated with the first entity is indicative of a pattern of malicious behavior; and
         in response to determining that the at least one anomaly associated with the entity is indicative of a pattern of malicious behavior, determining that the first entity is a malicious entity;
   searching data subsequently collected from the plurality of data sources to identify a second set of anomalies; and
   for each second entity associated with at least one anomaly in the second set of anomalies,
      determining if the at least one anomaly associated with the second entity corresponds to a pattern of malicious behavior in the set of one or more patterns of malicious behaviors determined by the prior analysis; and in response to determining that the at least one anomaly associated with the second entity corresponds to the pattern of malicious behavior in the set of one or more patterns of malicious behavior, determining that the second entity is a new malicious entity; and generating one or more alerts on any portion of the subsequently collected data that is associated with at least one malicious entity.

10. The method of claim 9, further comprising:

evaluating the one or more alerts generated by the inclusion of the at least some of the set of one or more anomalies to determine whether the at least some of the set of one or more anomalies are suitable to be used in a subsequent anomaly detection procedure.

11. The method of claim 10, further comprising:

using the at least some of the set of one or more anomalies that are determined to be suitable in the subsequent anomaly detection procedure.

12. The method of claim 9, wherein the set of one or more anomalies is implemented in a structured format that is useable by a computing system when searching the subsequently collected data for inclusion of the at least some of the set of one or more anomalies.

13. The method of claim 9, wherein the generated one or more alerts specify one or more entities associated with the at least some of the set of one or more anomalies and date that the at least some of the set of one or more anomalies occurred.

14. The method of claim 13, wherein the one or more entities comprise one or more of a machine name, a user name, an IP address, or a network identifier.

15. The method of claim 13, wherein the date that alert occurred also includes an associated time stamp.

16. The method of claim 9, wherein the plurality of data sources include logs from one or more of a specific computer, routers on a network, an application, an operating system, network infrastructure, and cloud computing infrastructure.

17. A computer program product comprising one or more computer-readable storage media having thereon computer-executable instructions that are structured such that, when executed by one or more processors of a computing system, cause the computing system to perform at least:

access a set of one or more patterns of malicious behaviors associated with a first set of anomalies found in data collected from a plurality of data sources, the set of one or more patterns of malicious behaviors having been determined by a prior analysis of the first set of anomalies, the prior analysis comprising:

for each first entity associated with at least one anomaly in the first set of anomalies, determining if the at least one anomaly associated with the first entity is indicative of a pattern of malicious behavior; and in response to determining that the at least one anomaly associated with the first entity is indicative of a pattern of malicious behavior, determining that the entity is a malicious entity;

search data subsequently collected from the plurality of data sources to identity a second set of anomalies; and for each second entity associated with at least one anomaly in the second set of anomalies, determine if the at least one anomaly associated with the second entity corresponds to a pattern of malicious behavior in the set of one or more patterns of malicious behaviors determined by the prior analysis; and in response to determining that the at least one anomaly associated with the second entity corresponds to the pattern of malicious behavior in the set of one or more patterns of malicious behavior, determine that the second entity is a new malicious entity; and generating one or more alerts on any portion of the subsequently collected data that is associated with at least one malicious entity.

18. The computer program product of claim 17, further comprising:

evaluating the one or more alerts generated by the inclusion of the at least some of the set of one or more anomalies to determine whether the at least some of the set of one or more anomalies are suitable to be used in a subsequent anomaly detection procedure.

19. The computer program product of claim 18, further comprising:

using the at least some of the set of one or more anomalies that are determined to be suitable in the subsequent anomaly detection procedure.

20. The computer program product of claim 17, wherein the set of one or more anomalies is implemented in a structured format that is useable by a computing system when searching the subsequently collected data for inclusion of the at least some of the set of one or more anomalies.

* * * * *